(No Model.)

H. A. BROWN.
BOLT.

No. 350,231. Patented Oct. 5, 1886.

WITNESSES:
C. Neveux
C. Sedgwick

INVENTOR:
H. A. Brown
BY Munn & Co.
ATTORNEYS.

UNITED STATES PATENT OFFICE.

HENRY AUGUSTUS BROWN, OF TOLEDO, OHIO.

BOLT.

SPECIFICATION forming part of Letters Patent No. 350,231, dated October 5, 1886.

Application filed January 12, 1886. Serial No. 188,376. (No model.)

*To all whom it may concern:*

Be it known that I, HENRY AUGUSTUS BROWN, of Toledo, in the county of Lucas and State of Ohio, have invented a new and useful Improvement in Bolts, of which the following is a specification, reference being had to the annexed drawings, forming a part thereof, in which—

Figure 1:
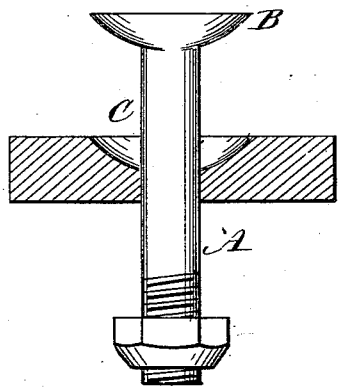
Figure 2:
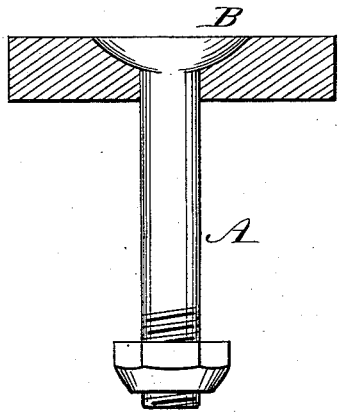
Figure 3:
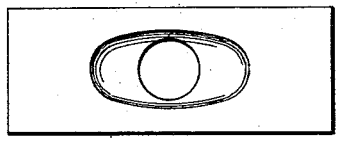
Figure 4:
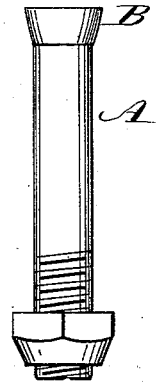
Figure 5:
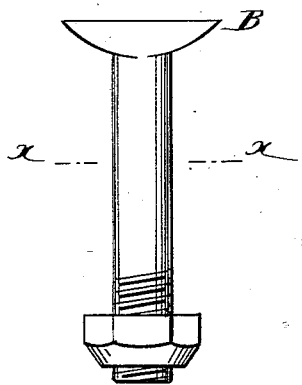
Figure 6:
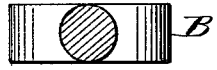

Figure 1 is a side elevation of my improved bolt. Fig. 2 is a side elevation of my improved bolt, showing its position when in use. Fig. 3 is a plan view of the countersink for receiving the bolt-head. Fig. 4 is a side elevation of a bolt, taken from a point of view at right angles with that of Fig. 1. Fig. 5 is a side elevation of a modified form of the bolt; and Fig. 6 is a transverse section taken on line $x\,x$ in Fig. 5, looking toward the bolt-head.

Similar letters of reference indicate corresponding parts in the different figures of the drawings.

My invention consists in a round bolt having an oblong countersink-head, to be received in a countersink or recess of similar form in the tire or other metal work in connection with which the bolt is to be used, the object being to prevent the bolt from revolving while the nut is turned on or off, and also to avoid the weakening of the tire or other metal work by the formation of a round countersink.

The bolt A is provided with an oblong countersink-head, B, the width of which may be about the same as the diameter of the bolt, or it may be wider, the length of the head being sufficient to give it the required hold in the metal in connection with which the bolt is used. The countersink C, in which the head of the bolt is received, is of a form corresponding with that of the bolt-head B, and will prevent the bolt from turning while the nut is being turned on or off.

My improved bolt is particularly adapted to fastening tires on wheels, and for use in connection with narrow pieces of metal work, as it does not necessitate the cutting away, and the consequent weakening, of the metal, which is unavoidable where an ordinary countersink-bolt is used. The elliptical head has a strength corresponding with that of the body of the bolt.

The bolt may be made by any of the well-known processes of manufacture, the head being formed in an oblong concave countersink die or mold.

The countersink for receiving the head of the bolt may be formed in the process of casting, or by milling, swaging, cutting, filing, or by punching the iron while it is cold or hot.

The under side of the bolt-head, in a section taken through its longer diameter and parallel with the axis of the bolt, is preferably made circular, so that a milling-tool may be used, if desirable, in making the countersink to receive it.

Having thus described my invention, what I claim as new, and desire to secure by Letters Patent, is—

A round bolt threaded at one end to receive a nut, and formed at its opposite end with an oblong convex shoulderless head, substantially as set forth.

HENRY AUGUSTUS BROWN.

Witnesses:
AUGUSTUS H. BROWN,
JAMES L. PEASE.